United States Patent
Lee et al.

(10) Patent No.: US 10,467,513 B2
(45) Date of Patent: Nov. 5, 2019

(54) VERIFICATION OF A PRINTED IMAGE ON MEDIA

(71) Applicant: Hand Held Products, Inc., Fort Mill, SC (US)

(72) Inventors: Phek Thong Lee, Singapore (SG); H. Sprague Ackley, Seattle, WA (US)

(73) Assignee: Datamax-O'Neil Corporation, Orlando, FL (US)

( * ) Notice: Subject to any disclaimer, the term of this patent is extended or adjusted under 35 U.S.C. 154(b) by 0 days.

(21) Appl. No.: 14/824,455

(22) Filed: Aug. 12, 2015

(65) Prior Publication Data
US 2017/0046603 A1    Feb. 16, 2017

(51) Int. Cl.
*G06K 15/00* (2006.01)
*G06K 15/02* (2006.01)
(Continued)

(52) U.S. Cl.
CPC ....... *G06K 15/4065* (2013.01); *G06K 15/022* (2013.01); *G06K 15/027* (2013.01); *G06K 15/16* (2013.01); *H04N 1/00047* (2013.01)

(58) Field of Classification Search
CPC ................................................. H04N 1/00047
See application file for complete search history.

(56) References Cited

U.S. PATENT DOCUMENTS 4,587,411 A * 5/1986 Obstfelder ............. B41J 29/393
101/483
5,272,322 A * 12/1993 Nishida .................. G06K 7/016
235/454

(Continued)

FOREIGN PATENT DOCUMENTS

JP    2011-201152 A    10/2011
WO    2013163789 A1    11/2013
(Continued)

OTHER PUBLICATIONS

U.S. Appl. No. 14/519,179 for Dimensioning System With Multipath Interference Mitigation, filed Oct. 21, 2014 (Thuries et al.); 30 pages.

(Continued)

*Primary Examiner* — Nicholas Pachol
(74) *Attorney, Agent, or Firm* — Addition, Higgins & Pendleton, P.A.

(57) ABSTRACT

Printing symbols on media is described. Sequential parts of a symbol are marked onto each of multiple corresponding sequential segments of the medium. A characteristic of each of the sequential symbol parts is evaluated. A speed is monitored with which the medium is moved upon the marking of each of the sequential symbol parts onto each of the corresponding sequential segments of the medium. An image, captured in relation to the evaluation, is adjusted based on the monitored speed. Adjusting the captured image may include setting a rate at which the evaluation of the characteristic of each of the sequential symbol parts is performed based on the monitored speed or alternatively, predicting a distortion in the evaluated characteristic of each of the sequential symbol parts corresponding to the monitored speed, and applying a change to the captured image corresponding to, and ameliorating the predicted distortion.

23 Claims, 4 Drawing Sheets

(51) Int. Cl.
  *G06K 15/16*  (2006.01)
  *H04N 1/00*  (2006.01)

(56) References Cited

U.S. PATENT DOCUMENTS

| | | | |
|---|---|---|---|
| 5,450,116 A * | 9/1995 | Weiselfish | A41H 3/007 347/171 |
| 5,820,280 A * | 10/1998 | Fox | B41J 29/38 192/48.9 |
| 6,002,844 A * | 12/1999 | Kishida | G06K 1/121 358/1.15 |
| 6,042,279 A * | 3/2000 | Ackley | G06K 1/121 400/103 |
| 6,135,354 A * | 10/2000 | Kubon | G06K 7/1478 235/462.11 |
| 6,535,299 B1 * | 3/2003 | Scherz | G06K 5/02 358/1.12 |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,736,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Baden | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Bremer et al. | |
| 8,870,074 B1 | 10/2014 | Gannon | |
| 8,879,639 B2 | 11/2014 | Sauerwein | |

(56) References Cited

U.S. PATENT DOCUMENTS

| | | |
|---|---|---|
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2002/0180475 A1* | 12/2002 | Watanabe ............ B01L 3/0241 436/180 |
| 2003/0067616 A1* | 4/2003 | Toyoda ................ G09G 3/3611 358/1.9 |
| 2004/0033098 A1* | 2/2004 | Chiu ..................... B41J 3/4075 400/615.2 |
| 2007/0063048 A1 | 3/2007 | Havens et al. |
| 2009/0058348 A1* | 3/2009 | Ryu ................... G03G 15/5008 318/639 |
| 2009/0134221 A1 | 5/2009 | Zhu et al. |
| 2009/0189935 A1* | 7/2009 | Kunimatsu ............ G06K 1/121 347/12 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0038652 A1* | 2/2011 | Kobayashi ......... G03G 15/5008 399/167 |
| 2011/0044724 A1* | 2/2011 | Funamoto .............. G03G 15/50 399/167 |
| 2011/0102850 A1* | 5/2011 | Watanabe ............ B41J 11/0095 358/3.26 |
| 2011/0149005 A1* | 6/2011 | Wolanski ................... B41J 3/44 347/107 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0057878 A1* | 3/2013 | Hopper ................ G06K 1/121 358/1.8 |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |

(56) References Cited

U.S. PATENT DOCUMENTS

| | | |
|---|---|---|
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0070418 A1* | 3/2015 | MacClary .......... B41J 3/01 347/9 |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2016/0080603 A1* | 3/2016 | Miyake .............. H04N 1/32352 358/3.28 |

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/264,173 for Autofocus Lens System for Indicia Readers, filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/231,898 for Hand-Mounted Indicia-Reading Device with Finger Motion Triggering, filed Apr. 1, 2014 (Van Horn et al.); 36 pages.

U.S. Appl. No. 14/715,916 for Evaluating Image Values, filed May 19, 2015 (Ackley); 60 pages.

(56) References Cited

OTHER PUBLICATIONS

U.S. Appl. No. 14/513,808 for Identifying Inventory Items in a Storage Facility, filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner, filed Sep. 10, 2014 (McCloskey et al.); 29 pages.
U.S. Appl. No. 14/531,154 for Directing an Inspector Through an Inspection, filed Nov. 3, 2014 (Miller et al.); 53 pages.
U.S. Appl. No. 29/525,068 for Tablet Computer With Removable Scanning Device, filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices, filed Apr. 1, 2015 (Yeakley et al.); 50 pages.
U.S. Appl. No. 14/257,364 for Docking System and Method Using Near Field Communication, filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone, filed Jun. 18, 2015 (Vargo et al); 16 pages.
U.S. Appl. No. 14/707,123 for Application Independent DEX/UCS Interface, filed May 8, 2015 (Pape); 47 pages.
U.S. Appl. No. 14/283,282 for Terminal Having Illumination and Focus Control, filed May 21, 2014 (Liu et al.); 31 pages.
U.S. Appl. No. 14/619,093 for Methods for Training a Speech Recognition System, filed Feb. 11, 2015 (Pecorari); 35 pages.
U.S. Appl. No. 29/524,186 for Scanner, filed Apr. 17, 2015 (Zhou et al.); 17 pages.
U.S. Appl. No. 14/705,407 for Method and System to Protect Software-Based Network-Connected Devices From Advanced Persistent Threat, filed May 6, 2015 (Hussey et al.); 42 pages.
U.S. Appl. No. 14/614,706 for Device for Supporting an Electronic Tool on a User'S Hand, filed Feb. 5, 2015 (Oberpriller et al.); 33 pages.
U.S. Appl. No. 14/628,708 for Device, System, and Method for Determining the Status of Checkout Lanes, filed Feb. 23, 2015 (Todeschini); 37 pages.
U.S. Appl. No. 14/704,050 for Intermediate Linear Positioning, filed May 5, 2015 (Charpentier et al.); 60 pages.
U.S. Appl. No. 14/529,563 for Adaptable Interface for a Mobile Computing Device, filed Oct. 31, 2014 (Schoon et al.); 36 pages.
U.S. Appl. No. 14/705,012 for Hands-Free Human Machine Interface Responsive to a Driver of a Vehicle, filed May 6, 2015 (Fitch et al.); 44 pages.
U.S. Appl. No. 14/715,672 for Augumented Reality Enabled Hazard Display, filed May 19, 2015 (Venkatesha et al.); 35 pages.
U.S. Appl. No. 14/695,364 for Medication Management System, filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display, filed Mar. 20, 2015 (Todeschini); 37 pages.
U.S. Appl. No. 14/735,717 for Indicia-Reading Systems Having an Interface With a User'S Nervous System, filed Jun. 10, 2015 (Todeschini); 39 pages.
U.S. Appl. No. 14/527,191 for Method and System for Recognizing Speech Using Wildcards in an Expected Response, filed Oct. 29, 2014 (Braho et al.); 45 pages.
U.S. Appl. No. 14/702,110 for System and Method for Regulating Barcode Data Injection Into a Running Application on a Smart Device, filed May 1, 2015 (Todeschini et al.); 38 pages.

U.S. Appl. No. 14/535,764 for Concatenated Expected Responses for Speech Recognition, filed Nov. 7, 2014 (Braho et al.); 51 pages.
U.S. Appl. No. 14/687,289 for System for Communication Via a Peripheral Hub, filed Apr. 15, 2015 (Kohtz et al.); 37 pages.
U.S. Appl. No. 14/747,197 for Optical Pattern Projector, filed Jun. 23, 2015 (Thuries et al.); 33 pages.
U.S. Appl. No. 14/674,329 for Aimer for Barcode Scanning, filed Mar. 31, 2015 (Bidwell); 36 pages.
U.S. Appl. No. 14/702,979 for Tracking Battery Conditions, filed May 4, 2015 (Young et al.); 70 pages.
U.S. Appl. No. 29/529,441 for Indicia Reading Device, filed Jun. 8, 2015 (Zhou et al.); 14 pages.
U.S. Appl. No. 14/747,490 for Dual-Projector Three-Dimensional Scanner, filed Jun. 23, 2015 (Jovanovski et al.); 40 pages.
U.S. Appl. No. 14/740,320 for Tactile Switch for a Mobile Electronic Device, filed Jun. 16, 2015 (Barndringa); 38 pages.
U.S. Appl. No. 14/695,923 for Secure Unattended Network Authentication, filed Apr. 24, 2015 (Kubler et al.); 52 pages.
U.S. Appl. No. 14/740,373 for Calibrating a Volume Dimensioner, filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.
U.S. Appl. No. 14/596,757 for System and Method for Detecting Barcode Printing Errors, filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications, filed Mar. 7, 2014 (Feng et al.); 42 pages.
U.S. Appl. No. 14/662,922 for Multifunction Point of Sale System, filed Mar. 19, 2015 (Van Horn et al.); 41 pages.
U.S. Appl. No. 14/446,391 for Multifunction Point of Sale Apparatus With Optical Signature Capture, filed Jul. 30, 2014 (Good et al.); 37 pages.
U.S. Appl. No. 29/528,165 for In-Counter Barcode Scanner, filed May 27, 2015 (Oberpriller et al.); 13 pages.
U.S. Appl. No. 29/528,890 for Mobile Computer Housing, filed Jun. 2, 2015 (Fitch et al.); 61 pages.
U.S. Appl. No. 14/614,796 for Cargo Apportionment Techniques, filed Feb. 5, 2015 (Morton et al.); 56 pages.
U.S. Appl. No. 29/516,892 for Table Computer, filed Feb. 6, 2015 (Bidwell et al.); 13 pages.
U.S. Appl. No. 29/523,098 for Handle for a Tablet Computer, filed Apr. 7, 2015 (Bidwell et al.); 17 pages.
U.S. Appl. No. 14/578,627 for Safety System and Method, filed Dec. 22, 2014 (Ackley et al.); 32 pages.
U.S. Appl. No. 14/573,022 for Dynamic Diagnostic Indicator Generation, filed Dec. 17, 2014 (Goldsmith); 43 pages.
U.S. Appl. No. 14/529,857 for Barcode Reader With Security Features, filed Oct. 31, 2014 (Todeschini et al.); 32 pages.
U.S. Appl. No. 14/519,195 for Handheld Dimensioning System With Feedback, filed Oct. 21, 2014 (Laffargue et al.); 39 pages.
U.S. Appl. No. 14/519,211 for System and Method for Dimensioning, filed Oct. 21, 2014 (Ackley et al.); 33 pages.
U.S. Appl. No. 14/519,233 for Handheld Dimensioner With Data-Quality Indication, filed Oct. 21, 2014 (Laffargue et al.); 36 pages.
U.S. Appl. No. 14/533,319 for Barcode Scanning System Using Wearable Device With Embedded Camera, filed Nov. 5, 2014 (Todeschini); 29 pages.
U.S. Appl. No. 14/748,446 for Cordless Indicia Reader With a Multifunction Coil for Wireless Charging and Eas Deactivation, filed Jun. 24, 2015 (Xie et al.); 34 pages.
U.S. Appl. No. 29/528,590 for Electronic Device, filed May 29, 2015 (Fitch et al.); 9 pages.
U.S. Appl. No. 14/519,249 for Handheld Dimensioning System With Measurement-Conformance Feedback, filed Oct. 21, 2014 (Ackley et al.); 36 pages.
U.S. Appl. No. 29/519,017 for Scanner, filed Mar. 2, 2015 (Zhou et al.); 11 pages.

(56) References Cited

OTHER PUBLICATIONS

U.S. Appl. No. 14/398,542 for Portable Electronic Devices Having a Separate Location Trigger Unit for Use in Controlling an Application Unit, filed Nov. 3, 2014 (Bian et al.); 22 pages.
U.S. Appl. No. 14/405,278 for Design Pattern for Secure Store, filed Mar. 9, 2015 (Zhu et al.); 23 pages.
U.S. Appl. No. 14/590,024 for Shelving and Package Locating Systems for Delivery Vehicles, filed Jan. 6, 2015 (Payne); 31 pages.
U.S. Appl. No. 14/568,305 for Auto-Contrast Viewfinder for an Indicia Reader, filed Dec. 12, 2014 (Todeschini); 29 pages.
U.S. Appl. No. 29/526,918 for Charging Base, filed May 14, 2015 (Fitch et al.); 10 pages.
U.S. Appl. No. 14/580,262 for Media Gate for Thermal Transfer Printers, filed Dec. 23, 2014 (Bowles); 36 pages.
Combined Search and Examination Report in counterpart GB Application No. 1613496.7 dated Feb. 7, 2017, pp. 1-8.
Rejection in related Chinese Application No. 201620871838.2 dated Jul. 21, 2017, pp. 1-2.
English translation of Rejection in related Chinese Application No. 201620871838.2 dated Jul. 21, 2017, pp. 1-3.
Rejection in related Chinese Application No. 201620871838.2 dated Aug. 20, 2018, pp. 1-3.
English translation of Rejection in related Chinese Application No. 201620871838.2 dated Aug. 20, 2018, pp. 1-4.

\* cited by examiner

EXAMPLE MEDIA PRODUCTS

VERIFICATION OF A PRINTED IMAGE ON MEDIA

TECHNOLOGY FIELD

The present invention relates generally to printing. More particularly, example embodiments of the present invention relate to printing symbols on media.

BACKGROUND

Generally speaking, data patterns and indicia such as bar code patterns, data matrix patterns, OCR (Optical Character Recognition) fonts, text characters, graphic images, logos and other one dimensional (1D) and two dimensional (2D) patterns of geometric and graphic data, which may be referred to herein with the term "symbols," are useful in a wide variety of applications. Some printers may be specialized for efficient printing of the data patterns.

Bar code printers may thus be widely deployed in various supply chain and identification applications. Printers for bar codes and other such symbols and indicia may use web printing techniques to apply markings related to writing, symbols, graphics, and other indicia onto a theretofore unmarked or pre-printed printable medium. The printable medium may thus comprise a web.

As used herein, the term "web" may refer to a strip of printable material that is significantly longer than it is wide. The web medium may be stored ready to use on a spool, magazine, fan-fold media, or other package or storage means. As printing is performed, the web medium is drawn from the storage means and fed longitudinally into the printer, where it is exposed to a printhead.

The printheads are operable for applying the markings controllably over at least one substantially planar surface of the printable web medium. The printheads may operate according to any mark application technology such as ink drop, matrix dot impact, toner, and any one of the various DPM (Direct Part Mark) printing technologies. The printheads of some bar code printers are operable thermally. The printable web medium used with such thermal printers comprises a heat sensitive material.

As the heat sensitive web medium is drawn into proximity with the thermal printhead, portions of its surface are marked controllably by selective heating therewith. The appearance of the surface portions may thus be darkened from a light shade (e.g., white or near-white) to print the markings. Alternately, the thermal printhead heats a thermally sensitive ribbon, which then transfers the heated image to a plain media substrate comprising the web. The printed web medium then emerges from the printer as a finished printing product.

Bar codes and other symbols may be printed and used as labels. The labels may comprise portions of the web medium, which may be separated therefrom as independent segments. A number of factors can affect the quality of the printing and thus the accuracy with which the markings are applied to the medium. Accurate printing allows labels to convey information correctly.

On the other hand, inaccurate printing may reduce the legibility of a label and cause errors in reading the information the label is intended to convey or provide graphics that are not aesthetically pleasing. The accuracy of the printing and the legibility of the label in relation to the information it is intended to present may be verified. For example, bar codes and OCR printed to particular specifications may be tested for compliance.

Verifying labels upon their emergence from the printers however adds cost, latency and complexity and occurs after the labels have already been printed, which can be wasteful. In-printer compliance testing techniques have thus been developed, with which verification of the labels is performed prior to their emergence from the printer.

In-printer compliance testing techniques may comprise capturing images of the nascent labels within the printer and during the print process. The captured images are evaluated for verification of the labels. In addition to capturing the verification images of each label, the in-printer verification may collect corresponding useful compliance testing statistics for every label printed.

In-printer compliance testing techniques may use the motion of the web medium to trigger the imaging of labels for verification and concomitant print quality correction in real-time. For example, the label may be imaged, digitized and sampled over at least part of the symbol, writing or graphic (hereinafter, "symbol") presented by the label or other product.

The imaged symbol portion is compared to a print command and related update data thus generated, with which print logic may be updated in real time to control the quality of the printing and thus the accuracy of the label. The verification imaging and the real time quality adjustments are responsive to the motion of the web medium. However, the motion may not be consistently linear.

In fact, the motion of the web medium may tend to be non-linear in some respects. For example, thermal printers may slow down as the end of the label approaches and in some other situations. The verification images made under these circumstances may become distorted, the real time print quality adjustment unreliable and thus, the in-printer label verification may be inaccurate.

Therefore, a need exists for accurate compliance testing of symbols printed on media prior to the production of printed items, which emerge from the printer. A need also exists for the capturing verification images of symbols, which uses the motion of web media upon which the symbols are printed. Further, a need exists for considering non-linearity in the motion of the web media in the capture of the verification images of the printed symbols and compensating for such non-linear movement.

SUMMARY

Accordingly, in one aspect, an example embodiment of the present invention embraces a printing method, which provides accurate compliance testing of symbols printed on media prior to the production of printed items. Example embodiments allow the capture of verification images of symbols and parts thereof, which uses the motion of web media upon which the symbols are printed. Further, example embodiments consider non-linearity in the motion of the web media in the capture of the verification images of the printed symbols and compensate for such non-linear movement.

In an example embodiment, the method for printing a symbol on a medium comprises marking a plurality of sequential parts of the symbol onto each of a corresponding plurality of sequential segments of the medium. A characteristic of each of the sequential symbol parts is evaluated. A speed is monitored with which the medium is moved upon the marking of each of the sequential symbol parts onto each of the corresponding sequential segments of the medium. An image captured in relation to the evaluation is adjusted based on the monitored speed.

In an example embodiment, the adjusting of the captured image comprises setting a rate at which the evaluating of the characteristic of each of the sequential symbol parts is performed based on the monitored speed.

In another example embodiment, the adjusting the captured image comprises predicting a distortion in the evaluated characteristic of each of the sequential symbol parts corresponding to the speed monitored upon the marking thereof. A change is applied to the captured image corresponding to the predicted distortion, in which the change applied ameliorates the predicted distortion.

The monitoring of the speed with which the medium is moved may comprise sensing a rate with which a motive force is imparted to the medium. The motive force may be imparted to the medium with a rotational and/or stepwise drive action. The monitoring of the speed with which the medium is moved may thus comprise sensing a rotation rate or a stepping rate of the drive action. Alternately, the speed may be ascertained by measuring the rotational rate of a roller that may be in contact with the media or by sensing marks that may be pre-printed on the media.

The printing method may also comprise generating data relating to the monitored speed. The adjusting of the captured image step may thus be performed in response to the data generated in relation to the monitored speed.

In another aspect, example embodiments of the present invention embrace a system operable for printing a symbol on a medium. In an example embodiment, the printing system comprises a marker operable for marking a plurality of sequential parts of the symbol onto each of a corresponding plurality of sequential segments of the medium. A scanner is operable for evaluating a characteristic of each of the sequential symbol parts.

A first controller is operable for monitoring a speed with which the medium is moved upon the marking of each of the sequential symbol parts onto each of the corresponding sequential segments of the medium. Based on the monitored speed, the controller is also operable for adjusting an image captured in relation to the evaluation of the characteristic of each of the sequential symbol parts based on the monitored speed.

The adjusting of the captured image may comprise setting a rate at which the evaluating of the characteristic of each of the sequential symbol parts is performed based on the monitored speed. The adjusting of the captured image may also (e.g., alternatively) comprise predicting a distortion in the evaluated characteristic of each of the sequential symbol parts corresponding to the speed monitored upon the marking thereof, and applying a change to the captured image corresponding to the predicted distortion. The change applied is operable for ameliorating the predicted distortion.

In an example embodiment, the monitoring of the speed with which the medium is moved may comprise sensing a rate with which a motive force is imparted to the medium. The motive force is imparted to the medium with a rotational and/or a stepwise drive action. The monitoring of the speed with which the medium is moved may thus comprise sensing a rate corresponding to the rotational and/or stepwise drive action.

The printing system may comprise at least a second controller, which is operable for controlling the rate with which a motive force is imparted to the medium. The system may also comprise a data link operable for communicatively coupling data from the at least second controller to the first controller. The data relates to the rate sensed at which the motive force is imparted to the medium.

The at least second controller sends the data relating to the rate sensed at which the motive force is imparted directly, via the data link, to the first controller. The first controller is operable in response to receiving the data for setting a rate at which the evaluating of the characteristic of each of the sequential symbol parts is performed.

The printing system may also comprise a recorder associated with the second controller. The recorder is operable with the second controller for recording the rate sensed at which the motive force is imparted to the medium.

The recorded rate may correspond to the data relating to the rate sensed at which the motive force is imparted to the medium. The recorder is further operable for sending the data corresponding to the recorded rate to the first controller.

The printing system may also comprise an image processor associated with the first controller and operable therewith in response to receiving the data. In response to receiving the data, the image processor predicts a distortion in the evaluated characteristic of each of the sequential symbol parts corresponding to the speed monitored upon the marking thereof. The image processor applies a change to the captured image corresponding to the distortion anticipated by the prediction. The change applied to the captured image ameliorates the predicted distortion therein.

In yet another aspect, example embodiments of the present invention embrace media products. An example embodiment relates to a media product comprising a symbol, such as a 1D bar code pattern or 2D data matrix pattern, which is printed on a medium by a printing process, as summarized in relation to the example method summarized above. Another example embodiment of the present invention relates to a non-transitory computer readable medium comprising instructions, which upon execution by a processor device are operable for controlling a printing system, or a computerized printer apparatus, to perform a process for printing a symbol on a medium, as summarized in relation to the example method summarized above.

In yet another aspect again, example embodiments of the present invention embrace non-transitory computer readable storage media. An example embodiment relates to a non-transitory computer readable storage media, which comprises instructions tangibly (physically, electronically, optically, magnetically, etc.) stored in one or more components thereof such as memory cells, optical, "flash" based, or magnetic storage media. The instructions are operable for causing, or controlling a computer processor to perform a printing process, such as the example printing process summarized above.

The foregoing illustrative summary, as well as other example features, functions and/or aspects of embodiments of the invention, and the manner in which the same are accomplished, are further explained within the following detailed description of example embodiments and each figure (FIG.) of the accompanying drawings.

DETAILED DESCRIPTION OF EXAMPLE EMBODIMENTS

Figure 1:
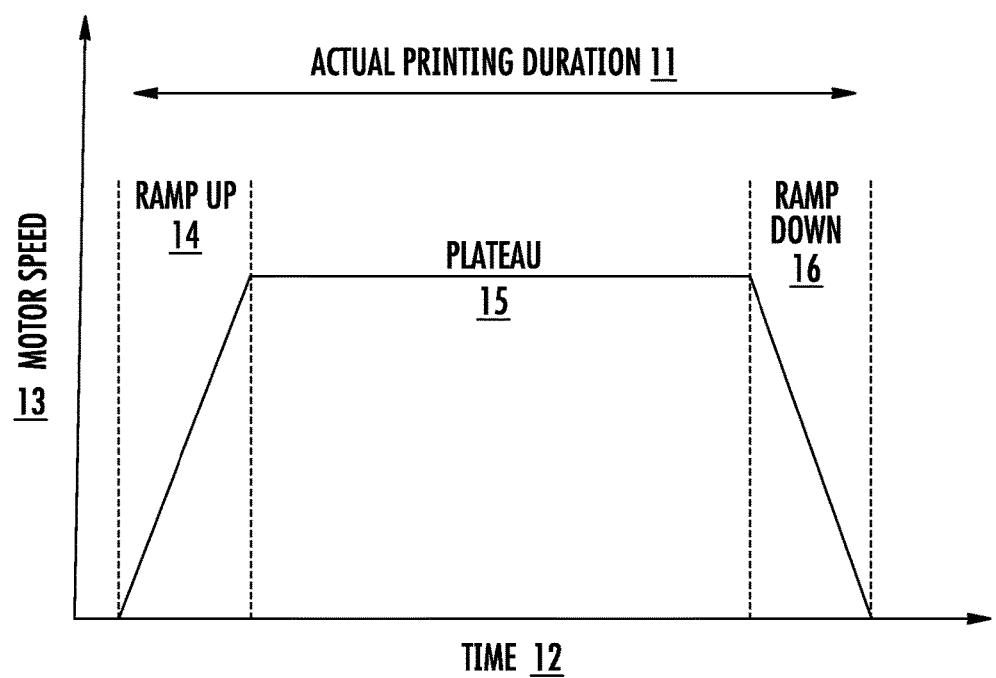
FIG. 1 depicts a graph an example speed of media movement, plotted over the duration of a printing event.

Example embodiments of the present invention are described in relation to printing symbols on media. Sequential parts of a symbol are marked onto each of multiple corresponding sequential segments of the medium. A characteristic of each of the sequential symbol parts is evaluated. A speed is monitored with which the medium is moved upon the marking of each of the sequential symbol parts onto each of the corresponding sequential segments of the medium. An image captured in relation to the evaluation is adjusted based on the monitored speed.

The adjusting of the captured image may comprise setting a rate at which the evaluation of the characteristic of each of the sequential symbol parts is performed based on the monitored speed. Alternatively, the adjusting of the captured image may comprise predicting a distortion in the evaluated characteristic of each of the sequential symbol parts corresponding to the monitored speed. A change corresponding to the predicted distortion is then applied to the captured image. The change applied to the captured image is ameliorative of the distortion predicted therein.

Overview

Example embodiments of the present invention relate to printing symbols on media. In an example embodiment, a method for printing a symbol on a medium comprises marking a plurality of sequential parts of the symbol onto each of a corresponding plurality of sequential segments of the medium. Characteristics of each of the sequential symbol parts are evaluated. A speed is monitored with which the medium is moved upon the marking of each of the sequential symbol parts onto each of the corresponding sequential segments of the medium. An image captured in relation to the evaluating is adjusted based on the monitored speed.

The adjustment of the captured image comprises setting a rate at which the evaluating of the characteristic of each of the sequential symbol parts is performed based on the monitored speed.

Alternatively, the adjusting the captured image comprises predicting a distortion in the evaluated characteristic of each of the sequential symbol parts corresponding to the speed monitored upon the marking thereof. A change is applied to the captured image corresponding to the predicted distortion, in which the change applied ameliorates the predicted distortion.

Example embodiments also relate to a printing system, printed media products, and to non-transitory computer readable media.

Example embodiments of the present invention thus relate to a printing process, which provides accurate compliance testing of symbols printed on media prior to the production of printed items, which emerge from the printer. Example embodiments allow the capture of verification images of symbols, which uses the motion of web media upon which the symbols are printed. Further, example embodiments consider non-linearity in the motion of the web media in the capture of the verification images of the printed symbols and compensate for such non-linear movement.

Example Printers

In-printer compliance testing techniques may comprise capturing images of the nascent labels. The captured images are evaluated for verification of the labels. In addition to capturing the verification images of each label, the in-printer verification may collect corresponding useful compliance testing statistics for every label printed. The in-printer compliance testing techniques may use the motion of the web medium to trigger the imaging of labels for verification and concomitant print quality correction in real-time. For example, the label may be imaged, digitized and sampled over at least part of the symbol, writing or graphic (symbol) presented by the label.

For example, the U.S. Pat. No. 6,042,279 to H. Sprague Ackley ("Ackley," one of the present Applicants) describes printing with real-time print quality correction, such as in 1D or 2D bar code printing, which is assigned to the common Assignee of the present application. A feedback mechanism has an imaging head for imaging, digitizing, or sampling at least a portion of a symbol, a comparator for comparing the imaged portion to a print command provided by a print logic print driver so as to generate print logic update information, wherein the print logic is updated in real time in response to the print logic update information.

The printing method and apparatus thus described may relate to a printing method, a printer system and/or other aspects or embodiments of an embodiment of the present invention. The U.S. Pat. No. 6,042,279 to Ackley is incorporated by reference for all purposes, as if fully set forth herein. Example printers may include PM43, PM23, PD43, PD42, PX4i, PM4i, PC43, PC23 model printers and/or models from the PX-series, PF-series, PM-series, PD-series and/or PC-series of printer of printers (which are available commercially from Honeywell™ International, Inc., a corporation in New Jersey).

As described in the referenced U.S. Pat. No. 6,042,279 to Ackley, the imaged symbol portion is compared to a print command and related update data thus generated, with which print logic may be updated in real time to control the quality of the printing and thus the accuracy of the label. The verification imaging and the real time quality adjustments are responsive to the motion of the web medium. However, the motion may not be consistently linear.

The motion of the web media on which symbols are being printed may be non-linear in some respects. For example, thermal printers may tend to slow down as the end of the label approaches the end of a print process (and in some other situations). The images made under these circumstances may become distorted and the real time print quality adjustment unreliable and thus, and inadequate for use.

FIG. 1 depicts a graph 10 of an example speed of media movement, plotted over the duration 11 of a printing event. The horizontal ('x') axis of the graph 10 represents a time base 12, over which the duration 11 of the print event extends. The vertical ('y') axis 13 represents the speed of a motor driving the print medium upon which a symbol such as a bar code is printed in relation to the printing event over its duration 11.

The motor ramps up to an operational speed during an early portion 14 of the print event duration 11 until a speed plateau 15 is reached. The actual marking corresponding to the printing of a symbol (or portions thereof) upon the medium may commence upon reaching the plateau speed 15.

Later, e.g., towards an end portion 16 of the print event duration 11, the motor speed ramps down to a halt as the printing event is completed. Scanning relating to evaluating images captured to verify label compliance however may continue, at least in part, during the ramp down period 16. As the speed of the medium changes however, distortions such as printed element elongation, related to the speed change, may occur in the verification images captured during the ramp down period 16. Accordingly, in one aspect, an example embodiment of the present invention embraces a method for printing a symbol on a medium, which minimizes or eliminates such distortion. More complicated ramping profiles may occur e.g., when printing a batch of labels. Thus, the graph 10 represents label printing scenarios generally.

Example Process

Figure 2:
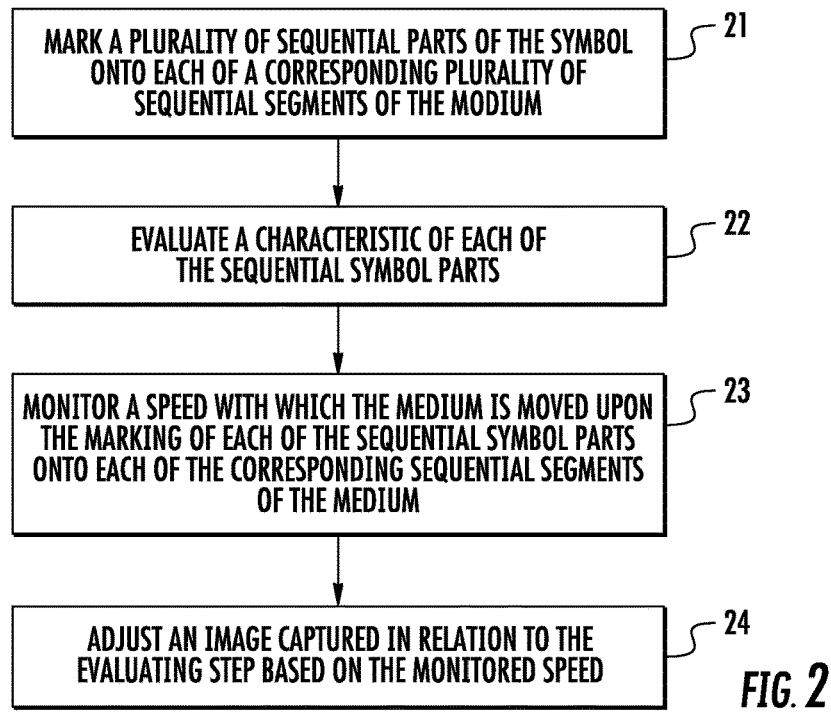
FIG. 2 depicts a flowchart for an example process for printing a symbol on a medium, according to an embodiment of the present invention.

FIG. 2 depicts a flowchart for an example process 20 for printing a symbol on a medium, according to an embodiment of the present invention.

In step 21, a plurality of sequential parts of the symbol onto each of a corresponding plurality of sequential segments of the medium.

In step 22, a characteristic of each of the sequential symbol parts is evaluated. For example, the scanner may capture and evaluate gray-level information (e.g. contrast) from the printed symbol.

In step 23, a speed is monitored with which the medium is moved upon the marking of each of the sequential symbol parts onto each of the corresponding sequential segments of the medium.

In step 24, an image captured in relation to the evaluating step is adjusted based on the monitored speed. In an example embodiment, the evaluating step may be adjusted based on a feedback data signal relating to the monitored speed.

Figure 3:
FIG. 3 depicts a flowchart for an example process step related to evaluating characteristics of symbol parts, according to an embodiment of the present invention.

FIG. 3 depicts a flowchart for an example process step related to evaluating characteristics of symbol parts, according to an embodiment of the present invention. The process step 30 may comprise a portion of the step 24 of the process 20 (FIG. 2).

In a step 240, the adjusting of the captured image step comprises setting a rate at which the evaluating of the characteristic of each of the sequential symbol parts is performed based on the monitored speed.

In another example embodiment, the adjusting the captured image step comprises predicting a distortion in the evaluated characteristic of each of the sequential symbol parts corresponding to the speed monitored upon the marking thereof.

Figure 4:
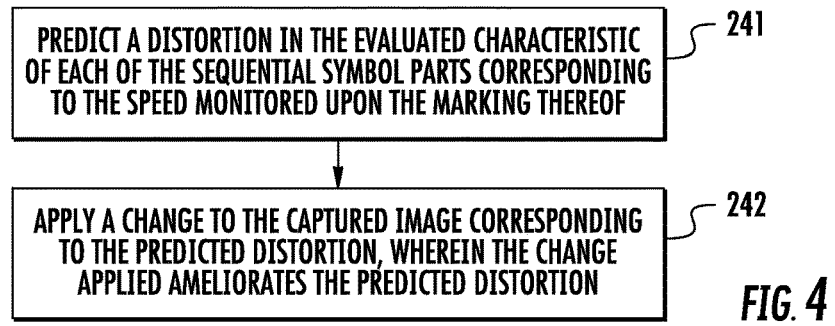
FIG. 4 depicts a flowchart for an example process step sequence related to evaluating characteristics of symbol parts, according to an embodiment of the present invention.

FIG. 4 depicts a flowchart for an example process step sequence 40 related to evaluating characteristics of symbol parts, according to an embodiment of the present invention. The process step sequence 40 may comprise a portion of the step 24 of the process 20 (FIG. 2).

In a step 241, a distortion is predicted in the evaluated characteristic of each of the sequential symbol parts. The prediction of the distortion corresponds to the speed monitored upon the marking thereof.

In step 242, a change is applied to the captured image corresponding to the predicted distortion, in which the change applied ameliorates the predicted distortion.

The monitoring of the speed with which the medium is moved may comprise sensing a rate with which a motive force is imparted to the medium. The motive force may be imparted to the medium with a rotational and/or stepwise drive action. The monitoring of the speed with which the medium is moved may thus comprise sensing a rotation rate or a stepping rate of the drive action.

The printing method may also comprise generating data relating to the monitored speed. Referring again to FIG. 2, the step 24 comprising the adjusting of the captured image step may thus be performed in response to the data generated in relation to the monitored speed.

Example Printer System

Figure 5:
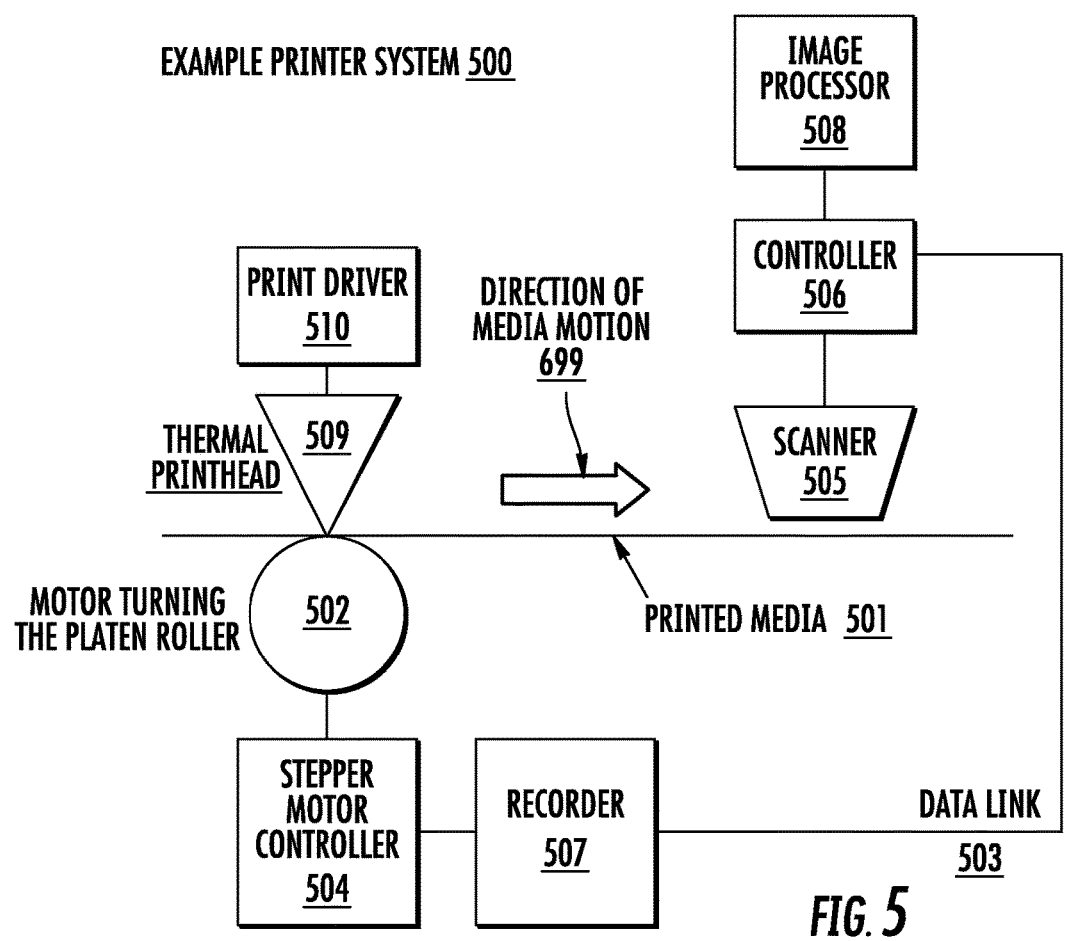
FIG. 5 depicts an example printer system, according to an embodiment of the present invention.

In another aspect, an example embodiment of the present invention embraces a system operable for printing a symbol on a medium. FIG. 5 depicts an example printer system 500, according to an embodiment of the present invention. The system 500 is operable for printing of the symbol on a medium. For example, the system 500 may be operable for performing the processes 20, 30, and/or 40, described respectively above with reference to FIG. 2, FIG. 3, and FIG. 4.

In an example embodiment, the system 500 comprises a marker 509, such as a thermal printhead. Driven and/or controlled with a print driver 510, the marker 509 is operable for marking a plurality of (e.g., multiple) sequential parts of the symbol onto each of a corresponding plurality of sequential segments of a printable medium ("printed media") 501. The printed media 501 may comprise a web of thermally sensitive material such as heat-sensitive paper or plastic. A scanner 505 is operable for evaluating a characteristic of each of the sequential symbol parts.

A first controller 506 is operable for monitoring a speed with which the medium 501 is moved upon the marking of each of the sequential symbol parts onto each of the corresponding sequential segments of the medium 501.

Based on the monitored speed, the first controller 506 is also operable for adjusting an image captured in relation to the evaluating the characteristic of each of the sequential symbol parts based on the monitored speed.

In an example embodiment, the adjusting of the captured image comprises setting a rate at which the evaluating of the characteristic of each of the sequential symbol parts is performed based directly on the monitored speed.

The adjusting of the captured image may also comprise predicting a distortion in the evaluated characteristic of each of the sequential symbol parts corresponding to the speed monitored upon the marking thereof. Applying a change to the captured image may thus correspond to the predicted distortion. The change applied is operable for ameliorating the predicted distortion.

In an example embodiment, the monitoring of the speed with which the medium 501 is moved may comprise sensing a rate with which a motive force is imparted to the medium 501. The motive force is imparted to the medium 501 with a rotational and/or a stepwise drive action, such as from a platen roller driven by a stepper motor 502. The monitoring of the speed with which the medium is moved may thus comprise sensing a rate corresponding to the rotational and/or stepwise drive action.

The printing system 500 may comprise multiple control functionalities, which may be implemented in hardware, software, and/or firmware. For example, the printing system 500 comprises at least a second controller 504 operable for controlling the rate with which a motive force is imparted to the medium.

The printing system 500 may also comprise a data link 503 operable for communicatively coupling data from the at least second controller 504 to the first controller 505. The data relates to the rate sensed at which the motive force is imparted to the medium 501.

The at least second controller 504 may send the data relating to the rate sensed at which the motive force is imparted directly, via the data link 503, to the first controller 506. The first controller 506 is operable in response to receiving the data for setting a rate at which the scanner 505 evaluates the characteristic of each of the sequential symbol parts.

The printing system 500 may also comprise a recorder 507 associated with the at least second controller 504. The recorder 507 is operable with the at least second controller 504 for recording the rate sensed at which the motive force is imparted to the medium 501.

The recorded rate may correspond to the data relating to the rate sensed at which the motive force is imparted to the medium. The recorder 507 is further operable for sending the data corresponding to the recorded rate to the first controller 506.

The printing system 500 may also comprise an image processor 508 associated with the first controller 506 and operable therewith in response to receiving the data. In response to receiving the data, the image processor 508 predicts a distortion in the evaluated characteristic of each of the sequential symbol parts corresponding to the speed monitored upon the marking thereof. For example, the distortion may relate to a relative number if image pixels used for each row of data acquired.

The image processor 508 applies a change to the captured image corresponding to the predicted distortion. The change applied to the captured image ameliorates the predicted distortion therein.

The image processor 508 may comprise microprocessor. One or more of the image processor 508, recorder 507, controllers 506 and/or 504, and/or print driver 510 may comprise an integrated circuit (IC) device such as a programmed microprocessor, or another programmed or configured IC device such as a programmable logic device (PLD), a microcontroller, field programmable gate array (FPGA), or application-specific IC (ASIC). One or more components of the printing system 500 may comprise processing and memory functionalities, which may be implemented with electronic hardware, software, and/or firmware.

The printer system 50 may be operable for performing the example printing processes 20, 30, and 40, as described above with reference to FIG. 2, FIG. 3, and FIG. 4, respectively. An example embodiment of the present invention relates to a non-transitory computer readable medium comprising instructions, which upon execution by a processor device are operable for controlling the printing system 50, or a computerized printer apparatus (e.g., 705; FIG. 7), to perform a process for printing a symbol on a medium, such as the printing processes 20, 30, and 40, above.

An example embodiment of the present invention relates to media product. The media product comprises a symbol, such as a 1D bar code pattern or 2D data matrix pattern. The media product is printed on a medium by a printing process, such as the example printing processes 20, 30, and 40, as described above with reference to FIG. 2, FIG. 3, and FIG. 4, respectively.

Figure 6A:
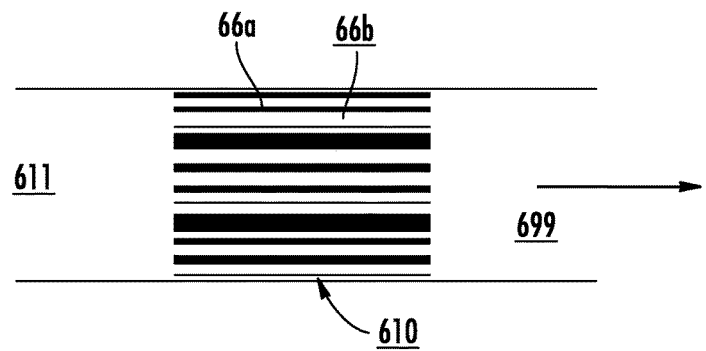
FIG. 6A depicts an example 1D bar code pattern, according to an embodiment of the present invention.

FIG. 6A depicts an example 1D bar code pattern 610, according to an embodiment of the present invention. The 1D bar code symbol 610 is depicted as though printed in a 'drag' mode on the print medium 611.

Figure 6B:
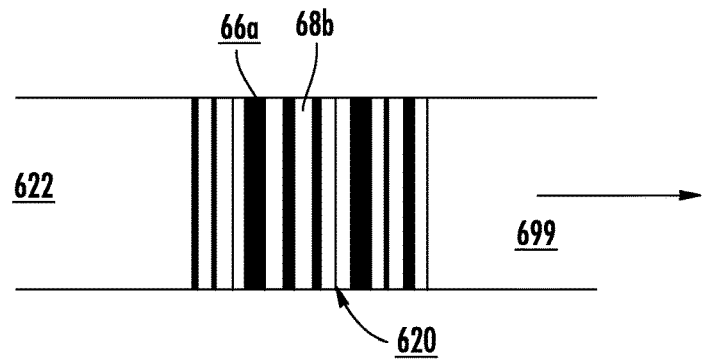
FIG. 6B depicts another example 1D bar code pattern, according to an embodiment of the present invention.

FIG. 6B depicts another example 1D bar code pattern 620, according to an embodiment of the present invention. The 1D bar code symbol 622 is depicted as though printed in a 'picket fence' mode on a print medium 622.

The bar code symbols 610 and 620 each comprise a plurality of bar elements 66a and a plurality of space elements 68b. The space elements 68b are disposed in parallel with the bar elements 66a. In the drag mode, the bar code symbol 610 is printed parallel to the direction of printing 699. In the picket fence mode, the bar code symbol 620 is printed in a perpendicular orientation to the direction of printing 699.

The bar code symbols 610 and 620 may each comprise data patterns related to, for example, an International (or "European") Article Number and/or Universal Product Code (EAN/UPC symbology) pattern, PDF417 (ISO/EC-15438 related) pattern, which comprise four of the vertical bar like symbols 66a disposed over 17 of the horizontally disposed spacer symbols 68b), 1D dot code pattern, or other 1D symbols.

Figure 6C:
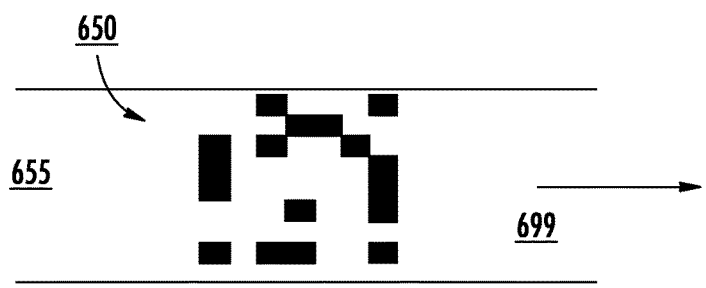
FIG. 6C depicts an example 2D matrix code pattern, according to an embodiment of the present invention.

FIG. 6C depicts an example 2D matrix code pattern 650, according to an embodiment of the present invention. The 2D matrix code pattern 650 comprises a matrix of 2D graphic symbol parts, such as squares and other rectangle and polygons, printed on a print medium 655. The matrix data pattern 650 may comprise a 2D data pattern related to, for example, quick-response (QR) and/or Han Xin graphical or geometric data matrices, or other 2D symbols.

Figure 6D:
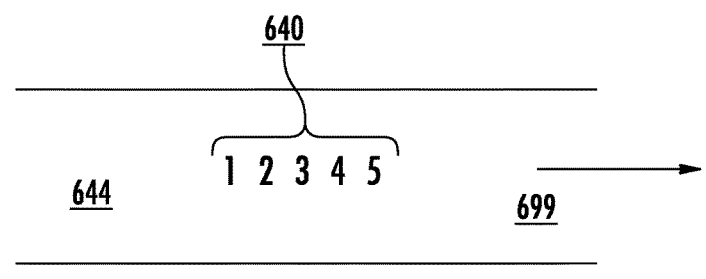
FIG. 6D depicts an example OCR code pattern, according to an embodiment of the present invention. The OCR code pattern 6xx comprises human readable symbol parts, such as numbers and letters, printed on a print medium.

FIG. 6D depicts an example OCR code pattern 640, according to an embodiment of the present invention. The OCR code pattern 6xx comprises human readable symbol parts, such as numbers and letters, printed on a print medium 644. The OCR data pattern 640 may comprise a 2D data pattern related to, for example, OCR-B or OCR-A, or other 2D symbols.

The print media 611, 622, 644 and 655 each move longitudinally in a direction 699 of respective printing operations. The print media 611, 622, 644, and 655 may each comprise a thermally sensitive paper or plastic material disposed in a web configuration, which is significantly longer than it is wide. The direction of printing 699 is parallel to a longitudinal axis of the print media 611, 622, 644, and 655, along which the media move.

The symbols 610, 620, 640 and 650 may be printed on the respective web media 611, 622, 644 and 655 according to the example process 20 (FIG. 2) and the process steps 30 (FIG. 3) and 40 (FIG. 4) described above. An example embodiment may be implemented in which print logic generates a print command, used by a print driver to activate and energize print elements of a printhead (e.g., thermal printhead 59; FIG. 5).

Responsive to the print command, the activated and energized printhead prints a part of the bar code 610, 620, and/or 650 and the media 611, 622, and/or 655, respectively, advance in the direction 699. Each time that the media is advanced, the print driver activates print elements of the printhead for printing of subsequent bar elements 66a, and spacing of parallel space elements 66b, onto a segment (e.g., portion) of the medium 699.

As the printed elements advance past the printhead, the scanner (e.g., scanner 55; FIG. 5) images the printed element and stores a digitized image of the printed element (e.g., symbol part) in a first memory array area. With 'linear' image heads, successive images of the printed element may be buffered sequentially into the first memory area in a correspondence with the succession. The print command may be stored in second memory area.

The image processor (e.g., image processor 58; FIG. 5) compares the digitized image stored in the first memory area with the print command stored in the second memory area. The digitized image of the symbols portion and the print command are compared pixel by pixel (pixel wise) or bit by bit (bitwise).

The digitized image may, additionally or alternatively, be compared to one or more other defined standards. Based on the results of the comparison, the print logic updates print information and determines whether the printed symbol parts differ from the desired image.

For example, the image parts may display distortion such as elongation or smearing. The elongation and/or smearing may be detected, and an extent of the distortion determined. The print logic update information may comprise, e.g., an updated pointer to a table of fonts or other programmed print features, with which a new print command may be generated.

A print quality report may be generated based on the comparison. The print quality report may indicate whether or not the printed image complies with a defined specification, stored in relation to evaluating the symbol and portions thereof. The print quality report, may indicate the manner in which the printed image differs from the desired image, and the steps taken by the printer to correct the deviation.

The bar elements of the machine readable data code symbol parts may comprise an array of closely proximate dots or other pixels (picture elements). As the medium 610 advances past the printhead, the scanner may digitize the pixels or other elements or features of the bar code symbols 610, 620, and/or 650. Successive portions of the elements may be imaged and stored in a memory area for comparison with the print command.

With the drag mode or the picket fence mode of printing, the digitized portion of the printed image comprises a portion of a plurality of the symbolic characters 66a and 68b. Scanning and/or concomitant sampling may be performed over a portion of the bar code characters 66a and 68b and compared with the print command. The print logic, as well as the print command and the print driver, may update before printing is complete over the entire bar code symbol 610.

Example embodiments of the present invention relate to printing the symbols on the media. In an example embodiment, a method for printing symbols on media comprises marking a plurality of sequential parts of a symbol onto each of a corresponding plurality of sequential segments of a medium. Characteristics of each of the sequential symbol parts are evaluated. A speed is monitored with which the medium is moved upon the marking of each of the sequential symbol parts onto each of the corresponding sequential segments of the medium. An image captured in relation to the evaluating step is adjusted based on the monitored speed.

The adjusting of the captured image step may comprise setting a rate at which the evaluating of the characteristic of each of the sequential symbol parts is performed based on the monitored speed. Alternatively, the adjusting the captured image step may comprise predicting a distortion in the evaluated characteristic of each of the sequential symbol parts corresponding to the speed monitored upon the marking thereof. A change is applied to the captured image corresponding to the predicted distortion, in which the change applied ameliorates the predicted distortion. Example embodiments also relate to printing systems, printed media products, and non-transitory computer readable media.

* * *

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;

U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;

U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);
U.S. patent application Ser. No. 29/529,441 for INDICIA READING DEVICE filed Jun. 8, 2015 (Zhou et al.);
U.S. patent application Ser. No. 14/735,717 for INDICIA-READING SYSTEMS HAVING AN INTERFACE WITH A USER'S NERVOUS SYSTEM filed Jun. 10, 2015 (Todeschini);
U.S. patent application Ser. No. 14/738,038 for METHOD OF AND SYSTEM FOR DETECTING OBJECT WEIGHING INTERFERENCES filed Jun. 12, 2015 (Amundsen et al.);
U.S. patent application Ser. No. 14/740,320 for TACTILE SWITCH FOR A MOBILE ELECTRONIC DEVICE filed Jun. 16, 2015 (Barndringa);
U.S. patent application Ser. No. 14/740,373 for CALIBRATING A VOLUME DIMENSIONER filed Jun. 16, 2015 (Ackley et al.);
U.S. patent application Ser. No. 14/742,818 for INDICIA READING SYSTEM EMPLOYING DIGITAL GAIN CONTROL filed Jun. 18, 2015 (Xian et al.);
U.S. patent application Ser. No. 14/743,257 for WIRELESS MESH POINT PORTABLE DATA TERMINAL filed Jun. 18, 2015 (Wang et al.);
U.S. patent application Ser. No. 29/530,600 for CYCLONE filed Jun. 18, 2015 (Vargo et al);
U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);
U.S. patent application Ser. No. 14/744,836 for CLOUD-BASED SYSTEM FOR READING OF DECODABLE INDICIA filed Jun. 19, 2015 (Todeschini et al.);
U.S. patent application Ser. No. 14/745,006 for SELECTIVE OUTPUT OF DECODED MESSAGE DATA filed Jun. 19, 2015 (Todeschini et al.);
U.S. patent application Ser. No. 14/747,197 for OPTICAL PATTERN PROJECTOR filed Jun. 23, 2015 (Thuries et al.);
U.S. patent application Ser. No. 14/747,490 for DUAL-PROJECTOR THREE-DIMENSIONAL SCANNER filed Jun. 23, 2015 (Jovanovski et al.); and
U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

* * *

Example embodiments of the present invention are thus described in relation to the printing of symbols on media. Sequential parts of a symbol are marked onto each of multiple corresponding sequential segments of the medium. Characteristics of each of the sequential symbol parts are evaluated. A speed is monitored with which the medium is moved upon the marking of each of the sequential symbol parts onto each of the corresponding sequential segments of the medium. An image captured in relation to the evaluation is adjusted based on the monitored speed. Adjusting of the captured image may comprise setting a rate at which the evaluation of the characteristic of each of the sequential symbol parts is performed based on the monitored speed. Alternatively, the adjusting of the captured image may comprise predicting a distortion in the evaluated characteristic of each of the sequential symbol parts corresponding to the monitored speed, and a change applied to the captured image corresponding to the predicted distortion. The change applied to the captured image is ameliorative of the distortion predicted therein.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are unnecessary for describing example embodiments of the invention, and not particularly relevant to understanding of significant features, functions and aspects of the example embodiments described herein.

In the specification and/or figures, typical embodiments of the invention have been disclosed. The present invention is not limited to such example embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed, is:

1. A method for printing a symbol on a medium, the method comprising the steps of:
    marking a plurality of sequential parts of the symbol onto each of a corresponding plurality of sequential segments of the medium;
    capturing an image of each individual sequential part with a scanner;
    monitoring a speed with which the medium is moved upon the marking of each of the sequential symbol parts onto each of the corresponding sequential segments of the medium by sensing a rotation rate of a drive action;
    evaluating a characteristic of each of the sequential symbol parts from the captured image; and
    adjusting the captured image in relation to the evaluating step based on the monitored speed.

2. The method as described in claim 1 wherein the adjusting the captured image step comprises setting a rate at which the evaluating of the characteristic of each of the sequential symbol parts is performed based on the monitored speed.

3. The method as described in claim 1 wherein the adjusting the captured image step comprises:
    predicting a distortion in the evaluated characteristic of each of the sequential symbol parts corresponding to the speed monitored upon the marking thereof; and
    applying a change to the captured image corresponding to the predicted distortion, wherein the change applied ameliorates the predicted distortion.

4. The method as described in claim 1, wherein the monitoring the speed with which the medium is moved comprises sensing a rate with which a motive force is imparted to the medium.

5. The method as described in claim 4, wherein the motive force is imparted to the medium with one or more of a rotational or a stepwise drive action and wherein the monitoring the speed with which the medium is moved comprises sensing a rotation rate or a stepping rate of the drive action.

6. The method as described in claim 1, further comprising generating data relating to the monitored speed, wherein the adjusting of the captured image step is performed in response to the generated data.

7. A system operable for printing a symbol on a medium, the system comprising:
- a marker operable for marking a plurality of sequential parts of the symbol onto each of a corresponding plurality of sequential segments of the medium;
- a scanner operable for evaluating a characteristic of each of the sequential symbol parts by capturing an image of each individual sequential symbol part; and
- a first controller operable for:
  - monitoring a speed with which the medium is moved upon the marking of each of the sequential symbol parts onto each of the corresponding sequential segments of the medium by sensing a rotation rate of a drive action;
  - and, adjusting the captured image based on the monitored speed.

8. The system as described in claim 7, wherein the adjusting of the captured image comprises setting a rate at which the evaluating of the characteristic of each of the sequential symbol parts is performed based on the monitored speed.

9. The system as described in claim 7 wherein the adjusting of the captured image comprises:
- predicting a distortion in the evaluated characteristic of each of the sequential symbol parts corresponding to the speed monitored upon the marking thereof; and
- applying a change to the captured image corresponding to the predicted distortion, wherein the change applied ameliorates the predicted distortion.

10. The system as described in claim 7, wherein the monitoring the speed with which the medium is moved comprises sensing a rate with which a motive force is imparted to the medium.

11. The system as described in claim 10, wherein the motive force is imparted to the medium with one or more of a rotational or a stepwise drive action and wherein the monitoring the speed with which the medium is moved comprises sensing a rate corresponding to the rotational or the stepwise drive action.

12. The system as described in claim 10, further comprising at least a second controller operable for controlling the rate with which a motive force is imparted to the medium.

13. The system as described in claim 12, further comprising a data link operable for communicatively coupling data from the at least second controller to the first controller, the data relating to the rate sensed at which the motive force is imparted to the medium.

14. The system as described in claim 13, wherein the at least second controller sends the data relating to the rate sensed at which the motive force is imparted directly via the data link to the first controller, which is operable in response to receiving the data for setting a rate at which the evaluating of the characteristic of each of the sequential symbol parts is performed.

15. The system as described in claim 13, further comprising a recorder associated with the at least second controller and operable therewith for recording the rate sensed at which the motive force is imparted to the medium.

16. The system as described in claim 15, wherein the recorded rate corresponds to the data relating to the rate sensed at which the motive force is imparted to the medium, and wherein the recorder is further operable for sending the data corresponding to the recorded rate to the first controller.

17. The system as described in claim 16, further comprising an image processor associated with the first controller and operable therewith in response to receiving the data for:
- predicting a distortion in the evaluated characteristic of each of the sequential symbol parts corresponding to the speed monitored upon the marking thereof; and
- applying a change to the captured image corresponding to the predicted distortion, wherein the change applied to the captured image ameliorates the predicted distortion therein.

18. A media product, which comprises a symbol printed on a medium by a method comprising the steps of:
- marking a plurality of sequential parts of the symbol onto each of a corresponding plurality of sequential segments of the medium;
- capturing an image of each individual sequential part with a scanner;
- monitoring a speed with which the medium is moved upon the marking of each of the sequential symbol parts onto each of the corresponding sequential segments of the medium by sensing rotation rate of a drive action;
- evaluating a characteristic of each of the sequential symbol parts from the captured image; and
- adjusting the captured image based on the monitored speed.

19. The media product as described in claim 18 wherein the adjusting of the captured image comprises setting a rate at which the evaluating of the characteristic of each of the sequential symbol parts is performed based on the monitored speed.

20. The media product as described in claim 18 wherein the adjusting of the captured image comprises:
- predicting a distortion in the evaluated characteristic of each of the sequential symbol parts corresponding to the speed monitored upon the marking thereof; and
- applying a change to the captured image corresponding to the predicted distortion, wherein the change applied ameliorates the predicted distortion.

21. A non-transitory computer readable medium comprising instructions which, upon execution by a processor device are operable for causing or controlling a printing system or printer apparatus to perform a method for printing a symbol on a medium, the method comprising the steps of:
- marking a plurality of sequential parts of the symbol onto each of a corresponding plurality of sequential segments of the medium;
- capturing an image of each individual sequential part with a scanner;
- monitoring a speed with which the medium is moved upon the marking of each of the sequential symbol parts onto each of the corresponding sequential segments of the medium by sensing a rotation rate of a drive action;
- evaluating a characteristic of each of the sequential symbol parts from the captured image; and
- adjusting the captured image based on the monitored speed.

22. The non-transitory computer readable medium as described in claim 21 wherein the adjusting the captured image comprises setting a rate at which the evaluating of the characteristic of each of the sequential symbol parts is performed based on the monitored speed.

23. The non-transitory computer readable medium as described in claim 21 wherein the adjusting the captured image comprises:

predicting a distortion in the evaluated characteristic of each of the sequential symbol parts corresponding to the speed monitored upon the marking thereof; and applying a change to the captured image corresponding to the predicted distortion, wherein the change applied ameliorates the predicted distortion.

\* \* \* \* \*